Dec. 18, 1928.
J. ALLEN
RESILIENT WHEEL
Filed March 30, 1928
1,695,629
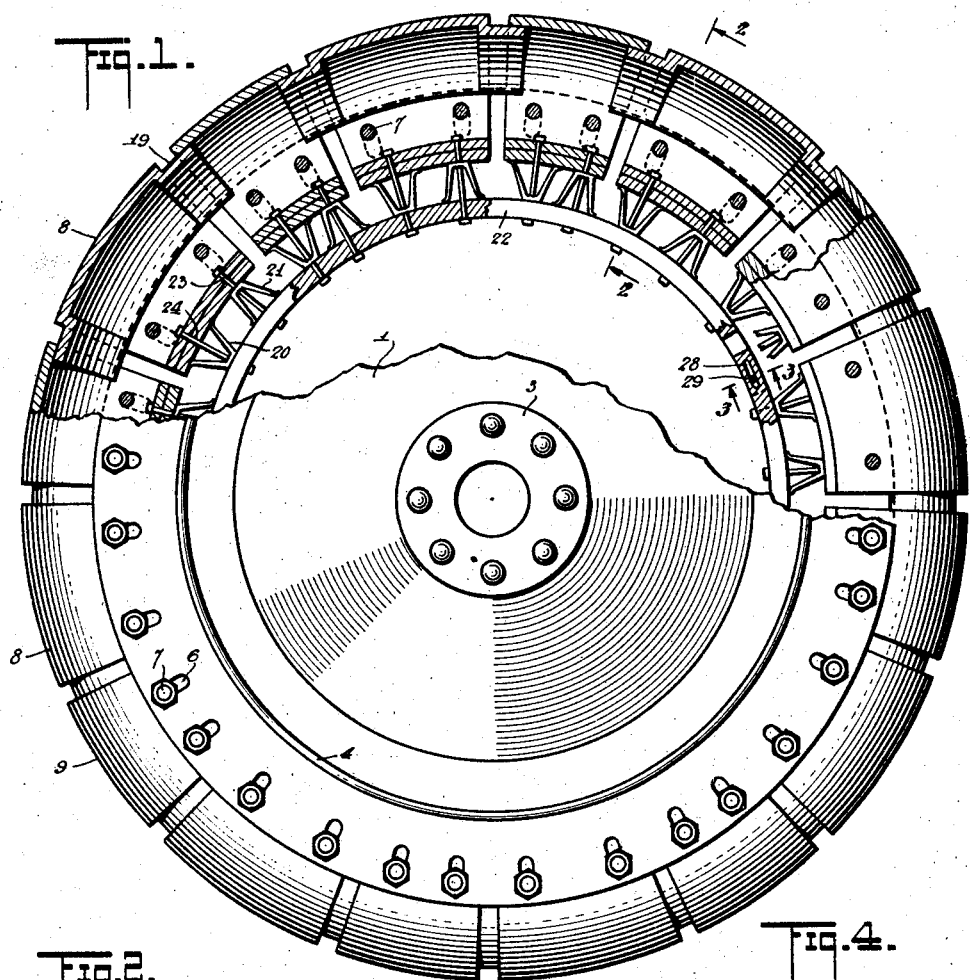
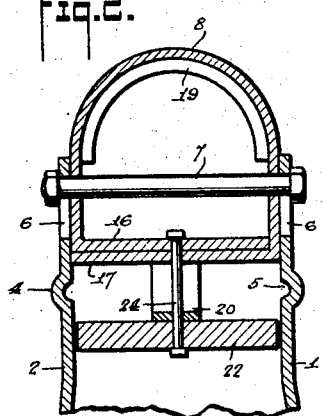
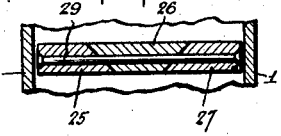
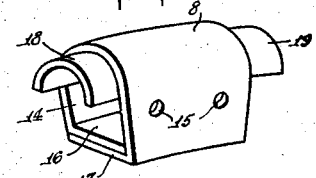
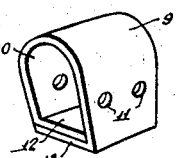
WITNESSES
INVENTOR
Jack Allen
BY
ATTORNEY Patented Dec. 18, 1928.

1,695,629

UNITED STATES PATENT OFFICE.

JACK ALLEN, OF BROOKLYN, NEW YORK.

RESILIENT WHEEL.

Application filed March 30, 1928. Serial No. 265,951.

This invention relates to resilient wheels, and has for an object to provide an improved construction wherein a very strong wheel is presented while substantially the resilient or cushioned effect of a pneumatic tire is produced without the use of compressed air.

Another object of the invention is to provide a resilient wheel wherein the resilient members are protected while functioning to resiliently hold in place a large number of overlapped contact segments.

A still further object of the invention is to provide a resilient wheel which is of the disk type and arranged with a tire formation presenting the general appearance of a pneumatic tire while actually being formed of a series of overlapped segments resiliently supported on the body of the wheel.

In the accompanying drawings,—

Figure 1 is a side view of a resilient wheel disclosing an embodiment of the invention, parts being broken away and shown in section, illustrating certain details of the invention;

Figure 2 is a fragmentary sectional view through Figure 1 approximately on the line 2—2;

Figure 3 is a detail fragmentary sectional view of Figure 1 on the line 3—3;

Figure 4 is a perspective view of one of the segmental members shown in Figure 1;

Figure 5 is a perspective view of the second form of segmental member shown in Figure 1.

Referring to the accompanying drawing by numerals, 1 and 2 indicate side plates provided with a hub structure 3 of any desired kind. The side plates or disks 1 and 2 are each provided with an annular portion 4 which is pressed out so as to press annular grooves 5 and an exterior annular bead. Outward of this annular groove are arranged a series of radially-disposed slots 6. As the plates or disks 1 and 2 are identical, the description of 1 will apply to both. As indicated in Figure 1, the slots 6 are near the outer edge of the periphery of the disk and carry the respective bolts 7. These bolts are of a size to make a snug sliding fit in the slots 6 so that they may move radially for the length of the slot. These bolts are designed to hold in proper operative position the respective segments 8 and 9 which are really tire segments, though they form part of the resilient wheel. These tire segments are formed substantially as shown in Figures 4 and 5. As indicated in Figure 5, segment 9 is made from a piece of sheet material bent to present a looped section 10 having apertures 11 and overlapped sections 12 and 13. Each of the segments 8 is similarly made, namely with a looped portion 14 having suitable apertures 15 and overlapped sections 16 and 17. In addition, the looped portion 14 is provided with arc-shaped extensions 18 and 19 which are preferably integral with the looped portion 14, as shown in Figure 1, said extension being depressed and constricted portions adapted to project to a point within the looped portion 10. In this way, the segments are overlapped as clearly shown in the upper part of Figure 1, so that each of the segments 8 may have a separate movement, while the segments 9 may move inwardly with either of the adjacent segments 8 and may move outwardly separately thereof. Each of the segments 8 and 9 is provided with a pair of supporting springs 20 and 21 carried by an inner ring 22. These springs are preferably substantially U-shaped and provided with an aperture at the center for accommodating the respective guiding bolts 23 and 24. The guiding bolts 23 and 24 extend through the overlapped portions of the members 8 and 9 through the supporting spring associated therewith and through the ring 22, as clearly shown in Figure 2. Each segment is preferably provided with two springs, as shown in Figure 1, with the feet of one spring resting on the ring 22 and the feet of the other spring resting on the segment. It will be understood that the feet of the respective springs are free and may slide slightly, if necessary, while the centers of the springs are maintained in a given position against either the segment or the ring 22. These springs are adapted to hold the segments so that the respective bolt 7 will be normally at the radially outer end of the respective slots 6. It is, of course, evident that these springs could be made with any desired resiliency, so that the wheel could be used for light loads or heavy loads. Where a light vehicle is to be supported as, for instance, a small, light passenger automobile, the springs are made correspondingly light and resilient. If a heavier load is to be carried, as for instance, a truck or two-ton automobile, the springs would naturally be heavier to support the extra load. The ring 22 is divided at one point, as indicated in Figures 1 and 3. At the point of division the respective ends are formed with overlapping sections 25, 26 and 27. Section 26 is provided with a slot 28 so that the bolt 29 extending through sections 25 and 27 may also extend through this slot and permit a relative sliding movement between section 26 and the other two sections. This is to take care of a certain movement in the ring 22 as the wheel functions. It will be noted that the bolts 7 will support the ring 22 through the respective springs 20 and 21. For instance, if the segments at the bottom of the wheel be pressed upwardly when the parts are in the position shown in Figure 1, a corresponding pressure will be brought to bear on the ring 22. This is distributed through all of the springs 20 and 21 to the various segments and consequently to the various bolts, except the bolts associated with the lowermost segments. In this way the lowermost segments may be pressed upwardly together or separately and present a desired cushioned or resilient action, while the strain is distributed throughout the wheel and eventually to the hub 3. As the wheel moves along the respective segments 8 and 9 will be depressed or moved in radially according to the weight being supported. As the wheel rotates and the segments are released they will automatically move outwardly and assume idle position, as indicated in Figure 1. In case any of the segments should become broken or injured in any way or in case any of the springs should become broken, two or more of the bolts 7 could be removed and new parts substituted, and after this has been done the wheel is in its normal useful condition. A certain number of segments 8 and 9 have been shown in the drawing, but it will be evident that a larger number could be used for the same size wheel, or even a smaller number. Preferably, a comparatively large number of segments are used, in order that a desirable cushioned effect may be secured on even comparatively rough roads. It will be noted that all of the parts are substantially water-tight except the slots 6, so that the chance of injury to any part is reduced to a minimum, and by reason of the easy removal of any segment, repairs may be made quickly and easily. Usually ordinary nuts may be used on bolts 7, although, if desired, lock nuts may be used or ordinary bolts and cotterpins.

What I claim is:—

1. A resilient wheel, comprising a body, a tire member associated with the body, said tire member being formed with a plurality of separate sections, certain of said sections being formed with underlapping extensions underlapping the adjacent sections, springs for normally holding said sections in an outer position, a floating ring for supporting said springs, a disk on each side of the floating ring and overlapping part of said tire member and a radially slidable connection between said disks and said tire member.

2. A resilient wheel, comprising a metal body having a hub member and a pair of disks formed with radially extending slots, a metal tire structure carried by the body formed of a plurality of separate sections movable radially separately, bolts extending through the slots in said disks and through said sections for limiting their radial movement, independent springs for each section for normally holding the section in an outer position and a floating ring for supporting the inner end of said springs.

3. A resilient wheel, comprising a metallic body having a pair of disks, each disk near the periphery having a plurality of radial slots, a tire member carried by said body and formed of a plurality of separate sections, part of each section extending between said disks, a plurality of bolts for each section, said bolts extending through said sections and through the respective slots, whereby the separate radial movements of the sections are limited, a floating ring arranged between said disks, a spring structure carried by said ring for each of said sections for resiliently holding the sections in an outer position, and a bolt for each spring extending through said ring and through the inner parts of the respective sections, said bolt permitting the sections to move toward the ring as far as the spring will permit but preventing the sections from moving away from the ring beyond the length of the bolt.

4. In a resilient wheel, a floating ring, a plurality of springs carried by the floating ring, a tire structure carried by said springs, the tire structure being formed in sections and each section associated with a certain number of springs, bolts connecting said tire sections and springs, said bolts being slidably mounted to limit radial movement of the sections separately of the ring, a disk on each side of said floating ring and overlapping the ring and part of the tire structure, said disks having radially positioned slots near their peripheries and bolts carried by said tire sections extending through said slots for connecting the tire structure to the disks, while allowing a limited separate movement of the tire structure.

5. In a resilient wheel, a wheel body and a tire structure carried by the wheel body, said tire structure including a plurality of sections, certain of the sections being formed of looped sheet metal presenting a link formation in cross-section, and others of said sections presenting a looped formation having arc-shaped extensions adapted to fit into adjacent sections so as to present an articulated tread structure.

Signed at New York, in the county of New York and State of New York this 29th day of March A. D. 1928.

JACK ALLEN.